US012425756B2

(12) United States Patent
Anderson et al.

(10) Patent No.: US 12,425,756 B2

(45) Date of Patent: Sep. 23, 2025

(54) QUICK RELEASE DOCKING OF WIRELESS MICROPHONE RECEIVER MODULE AND MIXER RECORDER

(71) Applicant: Sound Devices LLC, Reedsburg, WI (US)

(72) Inventors: Matthew G. Anderson, Madison, WI (US); Jason McDonald, Madison, WI (US); Jared Clabots, Madison, WI (US)

(73) Assignee: Sound Devices LLC, Reedsburg, WI (US)

( * ) Notice: Subject to any disclaimer, the term of this patent is extended or adjusted under 35 U.S.C. 154(b) by 168 days.

(21) Appl. No.: 18/509,856

(22) Filed: Nov. 15, 2023

(65) Prior Publication Data

US 2024/0163595 A1 May 16, 2024

Related U.S. Application Data

(60) Provisional application No. 63/384,003, filed on Nov. 16, 2022.

(51) Int. Cl.

*H04R 1/08* (2006.01)
*H04R 1/02* (2006.01)
*H04R 3/12* (2006.01)

(52) U.S. Cl.

CPC ............... *H04R 1/08* (2013.01); *H04R 1/025* (2013.01); *H04R 3/12* (2013.01); *H04R 2420/07* (2013.01); *H04R 2430/03* (2013.01)

(58) Field of Classification Search

CPC . H04R 1/08; H04R 1/025; H04R 3/12; H04R 2420/07; H04R 2430/03; H04H 60/04

See application file for complete search history.

(56) References Cited

U.S. PATENT DOCUMENTS 10,433,084 B2 10/2019 Anderson

OTHER PUBLICATIONS

"833 Portable Compact Mixer-Recorder User Guide v9.30", Sound Devices, 2019, 124 pages.
"A10-RACK 4-Slot Wireless Enclosure User Guide", Audio Ltd., 2018, 10 pages.
"SL-2 Dual Superslot Wireless Module for 8-Series Mixer-Recorders User Guide", Sound Devices, Jul. 2022, 14 pages.
"Zaxcom Nova User Manual", Software Version Nova 3.47, Sep. 2022, 67 pages.

*Primary Examiner* — Tuan D Nguyen

(74) *Attorney, Agent, or Firm* — Andrus Intellectual Property Law, LLP

(57) ABSTRACT

Methods and devices are provided for the modular construction of a mixer-recorder and wireless receiving modules, where the receiving modules may be optionally attached directly to the mixer-recorder without the need for cabling between them and/or in combination with corded units placed in the vicinity of the mixer-recorder.

8 Claims, 8 Drawing Sheets

QUICK RELEASE DOCKING OF WIRELESS MICROPHONE RECEIVER MODULE AND MIXER RECORDER

CROSS-REFERENCE TO RELATED APPLICATION

The present application claims priority of U.S. Provisional Patent Application No. 63/384,003 filed Nov. 16, 2022, the content of which is incorporated herein by reference in its entirety.

FIELD OF THE INVENTION

The disclosed invention provides a secure docking connection between a wireless RF receiver module and a mixer-recorder to eliminate the need for audio cabling when the wireless receiver can be reliably located adjacent the mixer-recorder, yet enables quick release of the microphone RF receiver module in the event that it is necessary to place a wireless microphone RF receiver module in a location remote from the mixer-recorder.

BACKGROUND

Wireless microphones are commonly used in numerous recording, playback or broadcast environments, including concerts, live stage recording, theatre, education, conferences, television or radio (the collection of these being referred to as wireless microphone environments). The microphone modules themselves are often configured as either handheld or as a smaller lavalier microphone unit that is connected to a wireless RF transmitter pack or unit, where each RF transmitter unit is typically dedicated to an associated microphone. A microphone transmitter module may be worn or carried by a user or mounted in proximity to a desired sound source such as a performer, talker, musical instrument or other acoustic source. Since a transmitter pack is typically located close to its associated microphone element, electronic circuitry within the transmitter pack often powers the microphone itself. Audio data (waveforms) are transmitted wirelessly from the RF transmitter unit and are received by a corresponding RF receiver module. This audio data is often subsequently provided to an audio mixing and recording system (where the operations of mixing, conditioning and recording are collectively combined into a mixer-recorder) so that the audio data may be combined with audio data received from other microphones located throughout the sound environment before being broadcast or saved to storage media.

As mentioned, when using wireless microphones, audio data is wirelessly communicated to another location for storage (recording), playback or broadcast. The efficacy of such a system depends on reliable RF transmission of audio data. Tradeoffs in the design of a wireless microphone transmitter include the size and weight of the battery, the transmitter output power level, useful battery life and bandwidth (or transmission data capacity) in order to maintain reliable transmission over a sufficient range for the physical placement or movement of the microphone module. Extending the allowable range of microphone modules for a fixed or lower transmitter power level provides an opportunity for using both a lighter weight battery, reduced power consumption and/or using a lower power transmitter design and may even aid in helping make devices compliant with FCC or other government regulations.

The RF transmitter unit should be as lightweight as possible, while providing a sufficiently long lifetime of operation without the need for battery recharging or replacement. At the same time, it is also desirable to provide ample RF transmission range to avoid dropouts, noise and distortion. The strength (and quality) of signal received by the RF receiver is dependent on both the strength (RF level) of the transmitted signal and the distance between the RF transmitter and the receiver. Accordingly, and especially in live recording sessions, efforts are often made to locate the receiver units within reasonable proximity to the paired transmitter units. As mentioned previously, the transmitter units may be mounted at a preset location for the convenience of performers but are often affixed to (and allowed to move along with) the performers themselves. In these cases, it may be desirable to place wireless microphone receivers in a location where the maximum expected distance of the performer from RF receiver unit is within a reliable wireless transmission range. For this reason, sound designers often place receiver units at some distance from the mixer-recorder. While this may reduce the distance that wireless audio data must be transmitted between the transmitter and receiver units, it often necessitates the use of complex wiring to provide connections between the receiver units and the mixing and recording equipment. Oftentimes, the complexity, weight, packaging of this cabling and (associated connectors) ultimately proves itself to be a source of uncertainty (or detriment) to the degree of manageability and reliability required by sound designers when attempting to configure such systems.

A rather straightforward approach involves simply placing receiving units at appropriate proximity to each corresponding transmitter unit and then cabling the audio information collected by each receiver unit to a mixing unit. This method entails the inherent disadvantage and unreliability associated with multiple connectors and a messy (or jumbled) configuration of wires and connectors. Historically, attempts that have been made to mitigate cabling issues in the prior art have included the design of rack-mount receiver station, where a series of microphone receiver units are collectively mounted in a rack-based array.

Audio equipment is often set up on one or more desks and/or sound carts or bags depending on the recording application and the equipment available. For non-integrated systems, the cabling associated with multiple receiver units can be quite cumbersome. Dante® Ethernet connections are less cumbersome and can be effective over long runs but tends to consume significant power. One rack that is available to hold and organize multiple receiver units is the A10-Rack manufactured by the assignee (Sound Devices, LLC) of this application. The A10-Rack has slots in which the receiver units are inserted to help organize the receiver units and provide power to the receivers but audio cabling or Dante® Ethernet connections are still used to transmit audio data to the mixer-recorder. The A10-Rack is suitable for setting on a table or attaching to a sound cart but is too large to be used with most sound bags. It is also typically not convenient to move one or more receivers to a location remote from a mixer-recorder but closer to selected transmitters when using the A10-Rack.

In some systems, multiple receivers are integrated into the mixer-recorder. An integrated configuration reduces cabling but prevents the receivers from being placed remotely from the mixer-recorder. For example, Zaxcom, Inc. produces a product known as "NOVA". It combines a mixer, recorder and receivers into an integrated unit. Unfortunately, the integrated nature of this product prevents users from removing and physically relocating receivers remote from the mixer-recorder.

Assignee makes a slot-in wireless receiver integration system, namely the SL-2, that mounts permanently to the top panel of compatible mixer-recorders and is particularly useful to reduce cabling when sound bags are used. Wireless receivers are inserted into the slots, and power is supplied from the mixer-recorder though an expansion port. Analog or digital audio data is transmitted one-way from the receivers into the mixer-recorder via the expansion port, reducing messy cabling for power and audio connectivity. While this system does reduce cabling requirements, it does not enable the receivers to be located physically remote from the mixer-recorder.

SUMMARY

The invention pertains to an audio recording system comprising a receiver module, a mixer-recorder and a module inter-connection apparatus. The receiver module includes one or more wireless RF receivers that each receive audio data transmitted from a paired wireless RF microphone transmitter. The receiver module has multiple digital and analog audio ports for audio data cabling and a module expansion port which outputs audio data and receives power, e.g., DC power to operate the receiver module. In the exemplary embodiment, the module expansion port uses pin connections, and is configured to output analog or digital data but is not configured to receive data. The mixer-recorder has multiple digital and analog audio ports for audio data cabling as is typical, but it also includes a mixer-recorder expansion port which receives audio data and provides power, again through pin connections in the exemplary embodiment. Further, in accordance with the invention, the module inter-connection apparatus has a first docking port that extends from a first side of the module inter-connection apparatus and mates with the module expansion port, a second docking port that extends from the other side of the module inter-connection apparatus and mates with the mixer-recorder expansion port. It is desirable that the expansion ports on both the receiver module and the mixer-recorder be recessed and generally not exposed beyond the respective surface of the component.

The module inter-connection apparatus is adapted to be attached to the receiver module with the first docking port (male) being connected electronically into the expansion port (female) on the receiver module. The module inter-connection apparatus is desirably attached permanently or semi-permanently (e.g. using screws) to the receiver module. The module inter-connection apparatus is also adapted to be removably attached to the mixer-recorder with the second docking port (male) being electrically connected into the expansion port (female) on the mixer recorder when the second side of the module inter-connection apparatus is physically attached to the mixer-recorder. The second side of the module inter-connection apparatus desirably has locating hooks and multiple quick release mechanisms to removably attach the combination of the receiver module and the module inter-connection apparatus to the mixer-recorder. Accordingly, the receiver module is secured to the mixer-recorder when desired without the need for messy cabling but can be easily removed by disengaging the quick disconnect latch levers to enable the receiver module to be located remotely from the mixer-recorder when necessary to improve transmission reliability for a given set or stage.

In the exemplary embodiment of the invention, the receiver module includes an ID resistor which the mixer-recorder detects to determine whether the receiver module and the module inter-connection apparatus are connected. If the ID resistor is not detected present, software on the mixer-recorder assumes that the receiver module and the module inter-connection apparatus are not attached, and the mixer-recorder operates in its normal mode. On the other hand, if the ID resistor is detected to be present, the mixer-recorder provides electrical power through the mixer-recorder expansion port to the receiver module and the receiver module boots up if not already active. Also, the mixer-recorder disables certain ports and assigns the respective channels to the receiving channels active in the attached receiver module. The system is then ready for the receiver module to transmit audio data through the module expansion port to the mixer-recorder. Certain rear panel data ports on the receiver module, apart from Ethernet, USB and antenna connectors, are also disabled when the expansion port is in use. The control of the receiver module is desirably through the user interface on the receiver module or via web communication with the receiver module.

The module inter-connection apparatus in the exemplary embodiment has an attachment plate that attaches to the receiver module, e.g. a screw connection, and includes an opening to provide access to the module expansion port. The latch member is attached to the attachment plate, desirably in a semi-permanent manner. The module inter-connection apparatus also includes a latch member that has the first docking port and the second docking port, and also quick release latch levers configured to releasably attach to latch posts on the mixer-recorder. The latch member has a stationary plate which is attached to attachment plate, semi-permanently in the exemplary embodiment. The first docking port passes through an opening in the attachment plate for the module expansion port when the latch member is attached to the attachment plate and electrically engages the receiver module expansion port. The latch member also has a movable latch plate that moves parallel to the stationary plate in response to the actuation of the quick release latch levers.

In the exemplary embodiment, latch posts are mounted on the mixer-recorder to facilitate the quick release of the module inter-connection apparatus and the receiver module from the mixer-recorder. The attachment plate fixed to the receiver module has locator hooks that fit over latch posts to precisely position the module inter-connection apparatus relative to the mixer-recorder, and more particularly so that the docking port (male) is aligned precisely over expansion port (female) on the mixer-recorder. Then, the quick release levers are put in an open position to move the latch plate and align latch posts on the mixer-recorder with enlarged ends of locking slots in the latch plate, and the receiver module and the module inter-connection apparatus are pressed together to engage the second docking port into the expansion port on the mixer-recorder. The quick release latch levers are then positioned in a closed position to lock the second docking port in the mixer-recorder expansion port.

It is contemplated that the module inter-connection apparatus be an optional accessory but that the receiver module and the mixer-recorder be configured to be compatible with its use. In this regard, as mentioned, it is desirable that the module expansion port on the receiver module be recessed with respect to the surface on which the port is located and also that the mixer-recorder expansion port be recessed relative to the surface on which the port is located. A cover over the recessed expansion ports can be used when the module inter-connection apparatus is not in use.

Within the context of the invention, the microphone receiver module provides the function for one or more wireless microphone receiving units that remain operative in attempting to continue receiving wireless data from paired microphone RF transmitter units. These receiver units may be integrated into a single receiver module. Rather than directly integrating the receiver module into the mixer-recorder, the receiver module is separate where it may be either directly connected to the mixer-recorder module or when preferred, placed at a nominal distance (usually in the general direction of transmitter units) and connected via a wired connector or wireless connection to the mixer-recorder module.

It is contemplated that one or more multi-channel receiver modules be able to implement the diversity reception method described in U.S. Pat. No. 10,433,084, entitled "Network System for Reliable Reception of Wireless Audio," by Matt Anderson and assignee to the assignee of the present application, which is incorporated herein by reference. In particular, multi-channel receiver modules can be placed apart from the mixer-recorder and serve as receiving base stations. The receiving base stations collect audio data for each channel from a paired transmitter and also collect quality of signal information. The receiving base stations process the audio data they receive into a Dante® compatible format and transmit the audio data and the quality of signal data over an Ethernet connection. Different channels in the various receiving base stations can be paired to the same microphone transmitter, and the receiver hub receives the Dante® compatible audio data (augmented with quality of signal information) from all of the active receiving channels, and outputs reconstructed audio data for each microphone transmitter taking into account the quality of signal information among competing receiving channels. The receiving base stations (i.e., receiver modules) are desirably connected by Dante® Ethernet wiring as shown e.g., in FIG. 2 of the '084 patent. Various components can serve as the receiver hub, e.g., the mixer-recorder, a computer, or one of the receiver modules. If one of the receiver modules serves as the receiver hub, it is possible for this receiver module to be connected to the mixer-recorder via the expansion port, rather than via a Dante® Ethernet connection. Reconstructed audio data can be generated in a number of ways, for example, dynamically selecting data sent by the receiver modules that has the lowest error rate in its decoded audio signal, selecting audio data from the receiver module reporting the highest signal strength, blending together audio data from multiple receiver modules to produce a decoded signal that is higher quality than what would otherwise be possible from audio data received from a single receiver module. The resultant reconstructed audio output may then be recorded, broadcast, mixed with other audio sources and/or played back to listeners via headphones or a loudspeaker arrangement.

DETAILED DESCRIPTION—RECEIVER RACK MOUNT (PRIOR ART)

Figure 1:
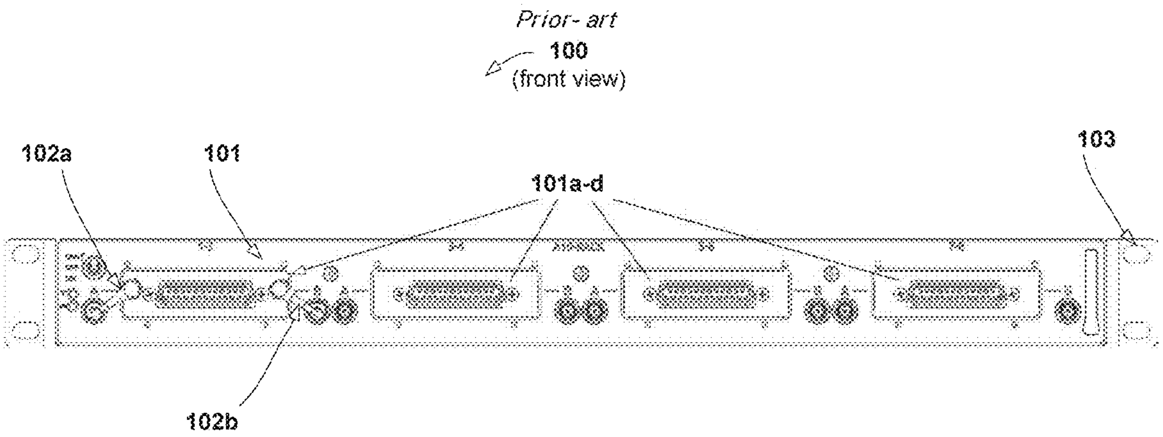
FIG. 1 is a simplified diagram for a wireless receiver rack-mounting system known in the prior art that allows for several microphone receiving units to be physically and electronically mounted into the rack. This view is shown from the front of the unit looking into the receiver slots.

FIG. 1 shows a receiver unit rack mount system 100 constructed in accordance with the known prior art, namely the A10 Rack 4-slot Wireless Enclosure manufactured by Sound Devices, LLC which is the assignee of the present application. As shown in FIG. 1, the faceplate 101 for the receiver rack mount system 100 includes four receiver unit slots 101*a-d*, wherein if each slot contains a stereo (2-channel) receiver, provides a total of eight (8) audio feeds. Each microphone receiver unit may be slid into and connected electrically within each slot 101*a-d*. The microphone receiver (not shown in FIG. 1) receives an audio waveform from a corresponding microphone RF transmitter (also not shown). FIG. 1 illustrates four receiver slots 101*a-d* shown side-by-side in row pattern, but in other embodiments, the slots may be arranged in multiple rows or a grid pattern. If a user places a microphone RF receiver in every one of these four slots 101*a-d*, the receiver rack mount system 100 is referred to as "fully populated." Although this example shows a total of four receiver slots 101*a-d*, it should be apparent to one skilled in the art that an arbitrary number of receiver slots could built into the unit 100 arrayed over the faceplate 101 as its size and geometry (compared to the size of the microphone receiving units) would allow.

The transmitted data allows for characterization of or describing the audio waveform over time. For example, with a digital wireless microphone, the audio waveform may be converted to an electrical waveform and digitized using an analog to digital converter (ADC) at a given sample rate. Audio data representing the digital samples can be transmitted by the microphone transmitter unit. In some embodiments, data compression may be used for reducing the data rate required for transmission of the audio waveform. In the case of an analog wireless microphone, the audio waveform can be used as a basis for frequency modulating a carrier output from the microphone transmitter. The modulation used for transmitting wireless audio data from the microphone module may rely on FM, phase-shift keying (PSK, BPSK, QPSK, etc.) or spread-spectrum techniques. Other elements not shown that may be part of the design for the microphone transmitter module include a housing for structural support, various circuits, power supplies, batteries, adapters, clips, amplifiers, companders, limiters, signal conditioners or filters, analog to digital converters, communications circuits, modulators, antennas, microprocessor, digital signal processors and/or software for configuration, control and operation of the microphone module that will be apparent to one skilled in the art. Each slot 101*a-d* accepts one (single- or dual-channel) 25-pin SuperSlot or unislot receiver. The connection provides power to the receiver and connects the receiver's audio output directly to the appropriate rear panel XLR connector and to the Dante® interface. The rack mount system 100 provides antenna distribution, power distribution, up to 8 channels of analogue and/or AES digital audio via XLR-M connectors and an 8 channel Dante®/Ethernet audio interface.

As shown in FIG. 1, the front faceplate 101 for this receiver rack mount system 100 has tabs with holes (sometimes called "ears") 103 along either side (or, if preferred, along the top and bottom as appropriate). This provides the user with mechanical connection points to conveniently mount the rack mount system 100 into a larger equipment rack (or sound cart), where bolts or attachment pins protrude through the ears 103 to affix the receiver rack mount system 100 within the larger framework of a sound cart.

Figure 2:
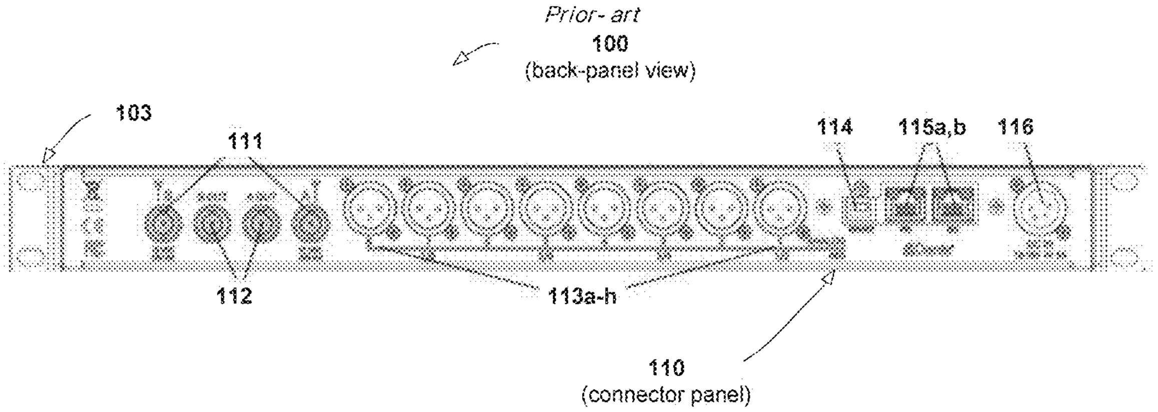
FIG. 2 is a simplified diagram for the wireless receive rack-mounting system known in the prior art shown in FIG. 1. This view is shown from the back end of the unit where an array of connectors is accessible for connection to other sound components such as a mixer-recorder using the appropriate cabling.

Referring now to FIG. 2, the back of a receiver rack mount system 100 includes a connector panel 110 that allows access to specific signals derived within it. The rack mount system 100 that provides the following six types of back panel connections:

1) Antenna inputs 111 via two 50 Ohm BNC sockets. It is worth noting that these are internally interconnected to the front-panel antenna leads (e.g., 102*a* and 102*b* in FIG. 1) that are meant to attach directly to the antenna inputs for a microphone receiver unit when it is plugged into the assigned slot.
2) Antenna Loop 112 through A/B Out BNC connectors provide auxiliary outputs as a passive loop through to a second (or subsequent) A10 rack mount system.
3) Eight (8) Analogue/AES XLR-M 113*a-h* connectors are used to transmit either analogue or AES digital audio in channel pairs.
4) A USB-B service connector 114 may be used for receiver unit firmware updates.
5) A pair of PRI/SEC RJ45 Dante network connections, 115*a,b*. PRI for primary non-redundant network connection, SEC for secondary redundant network connections.
6) A DC IN Connector 116 to supply power to the A10 rack mount system with a standard 4-pin XLR-F 10-18 VDC power supply.

The rack mount system 100 does not physically dock to a mixer-recorder or to any other mixer-recorders. Also, while the rack mount provides power to receivers that are slotted in, the rack mount system 100 does not communicate data to the slotted-in receivers.

It should be apparent at this point that even in cases where a mixer-recorder is paired with one or more receiver rack mount systems, significant (and complex) cabling requirements can exist. Taking this approach further compromises the reliability of receiver units since the position for the sound cart containing the receiver rack mounted system or in cases where an equipment bag is used to contain the mixer-recorder and rack mount receiver system (and internal antennas), conditions affecting the quality of receiver signals are often far from optimal.

DETAILED DESCRIPTION OF THE INVENTION

Figure 3:
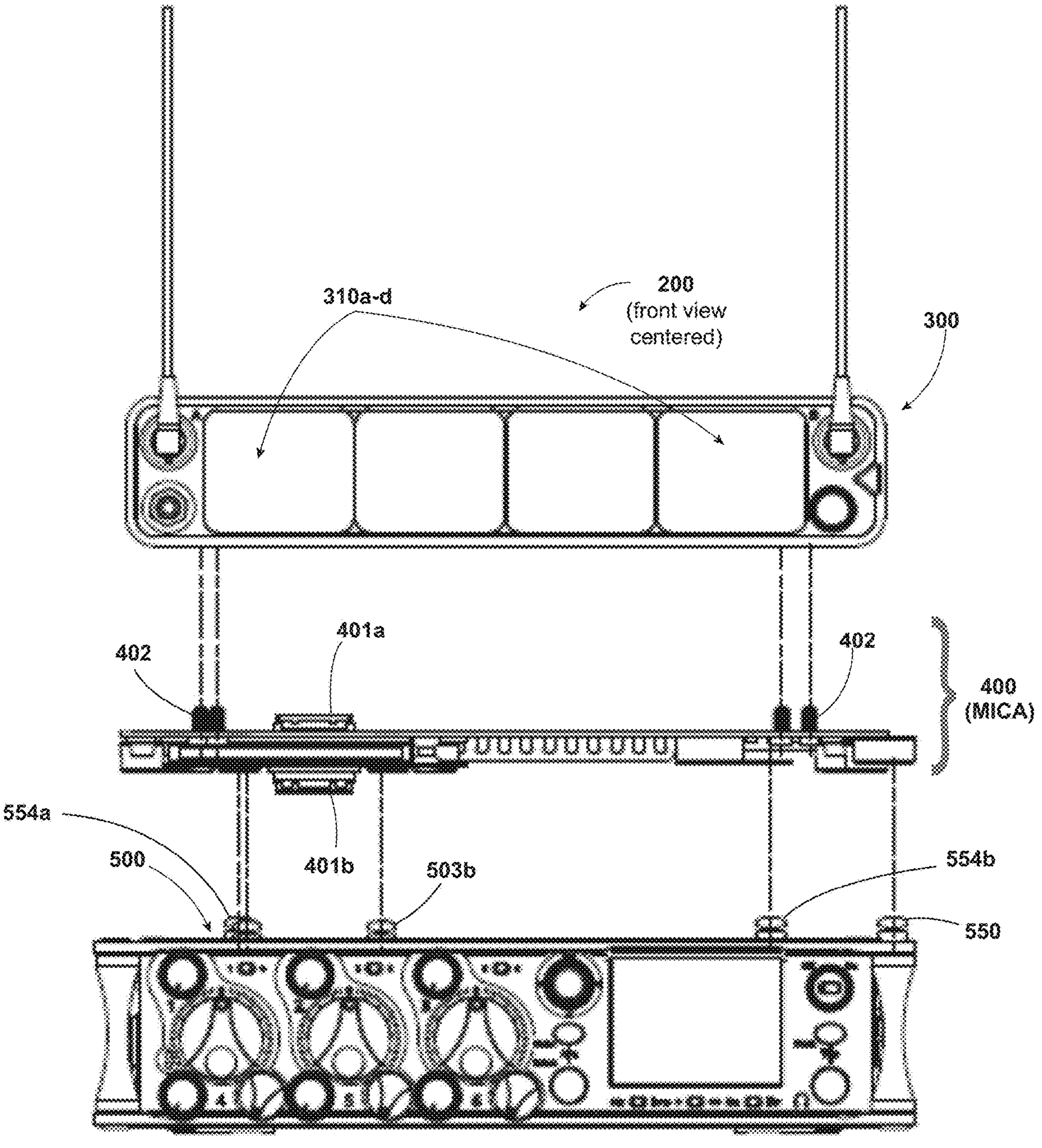
FIG. 3 is a front assembly view illustrating an exemplary embodiment of the present invention, showing of the attachment of a wireless microphone receiving module to a module inter-connection apparatus (henceforth referred to as "MICA") and further showing the quick release connection of the MICA and the wireless receiving module to a mixer-recorder with a receiver expansion port.
Figure 5:
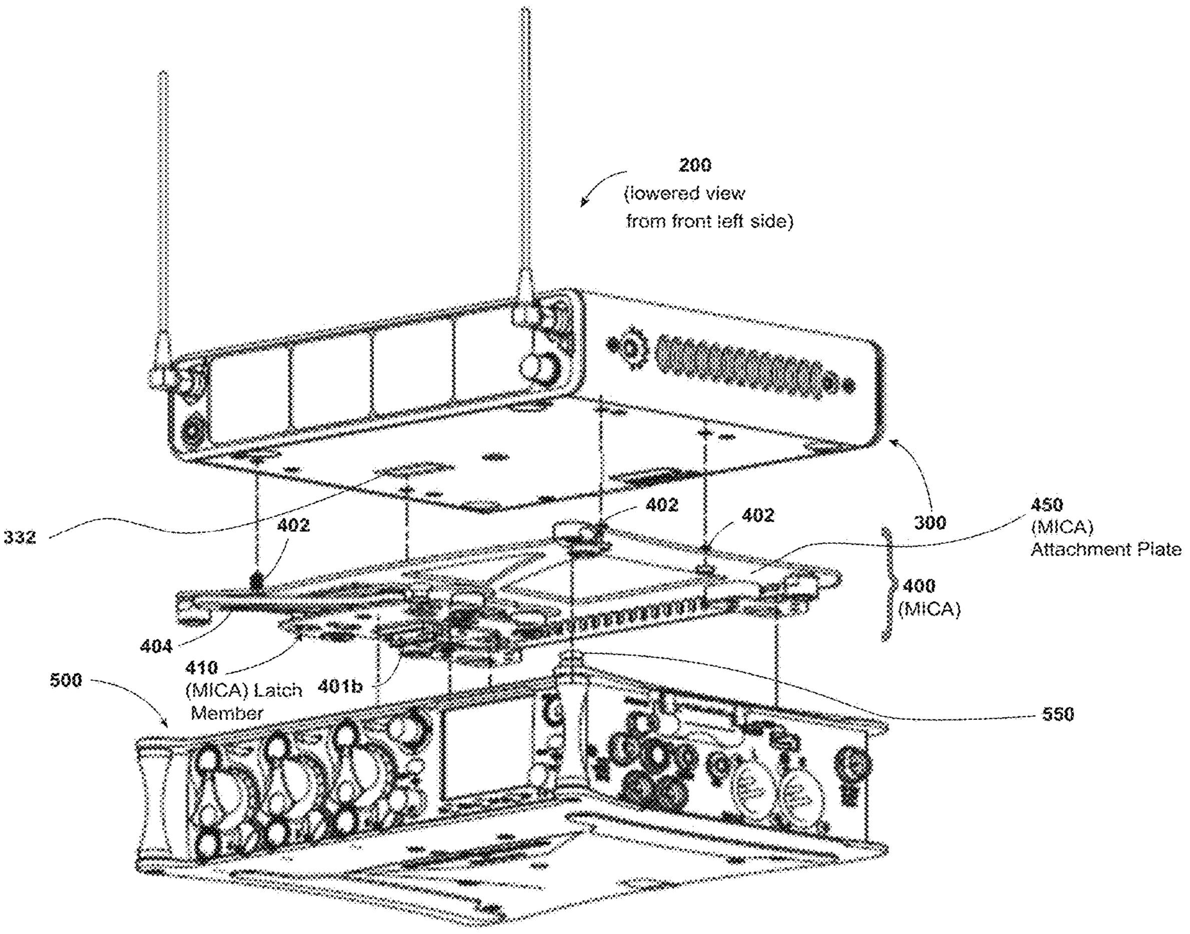
FIG. 5 is a lower perspective view of the components shown in FIG. 3.
Figure 6:
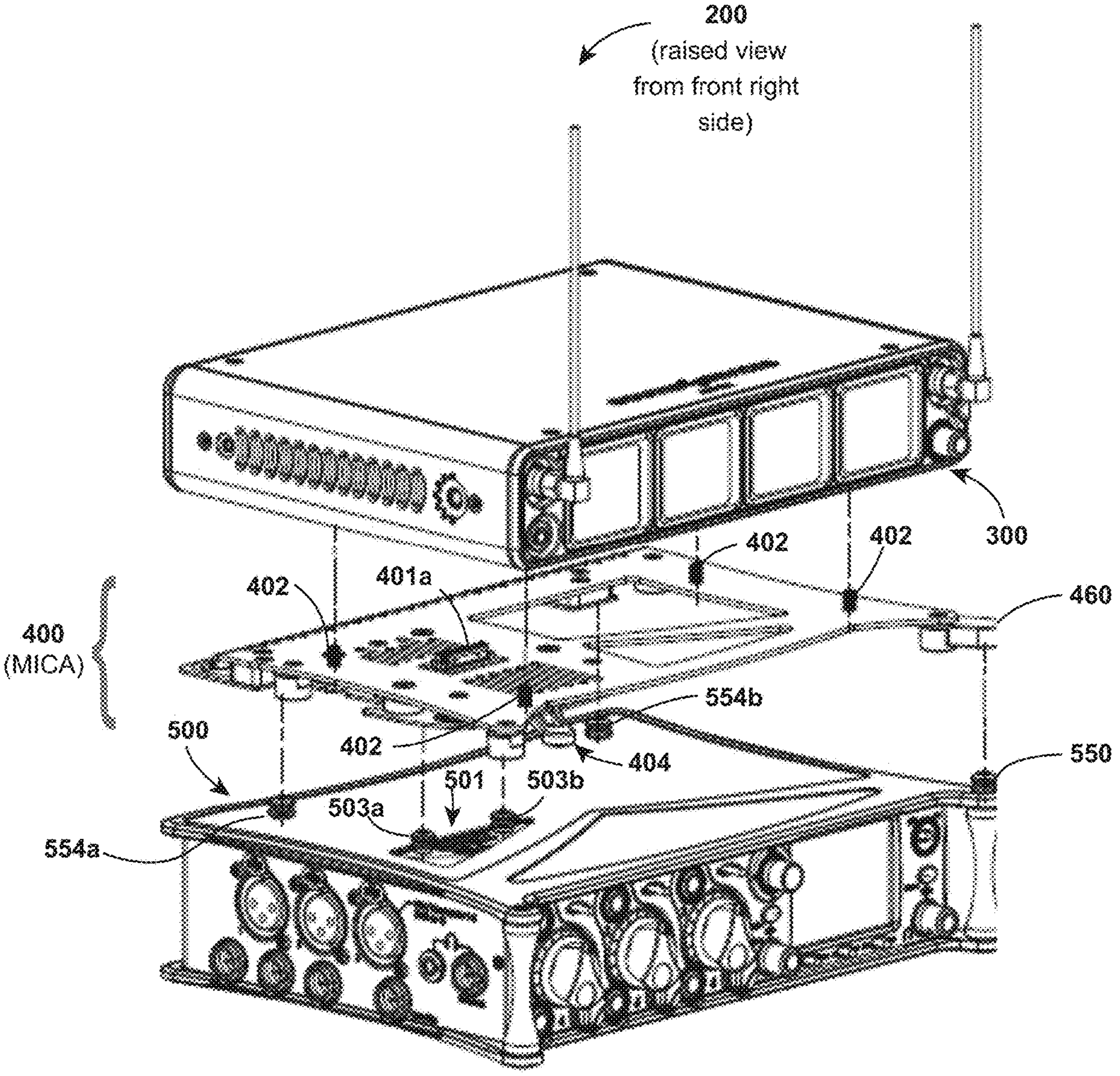
FIG. 6 is an upper perspective view of the components shown in FIG. 3 and FIG. 5.

FIGS. 3, 5 and 6 illustrate a module system 200 constructed in accordance with an exemplary embodiment of the invention. The modular system 200 simplifies connectivity between a wireless microphone RF receiver module 300 and a mixer-recorder 500 and enables the receiver module 300 to be connected physically and electrically to the mixer-recorder 500 without cabling or, alternatively, removed conveniently and placed remotely on set or stage in a physical location remote from the mixer-recorder 500 using cabling for electrical connections.

The wireless microphone receiver module 300 in the exemplary embodiment contains an array of microphone receiver units 310*a-d* that can be physically connected to the mixer-recorder 500 via a module inter-connection apparatus ("MICA") 400. This same embodiment is shown again in FIGS. 5 and 6 from a left-side lower perspective view and a right-side elevated perspective view, respectively, to further illustrate the construction and placement of built-in mechanical and electrical connectors.

Figure 8:
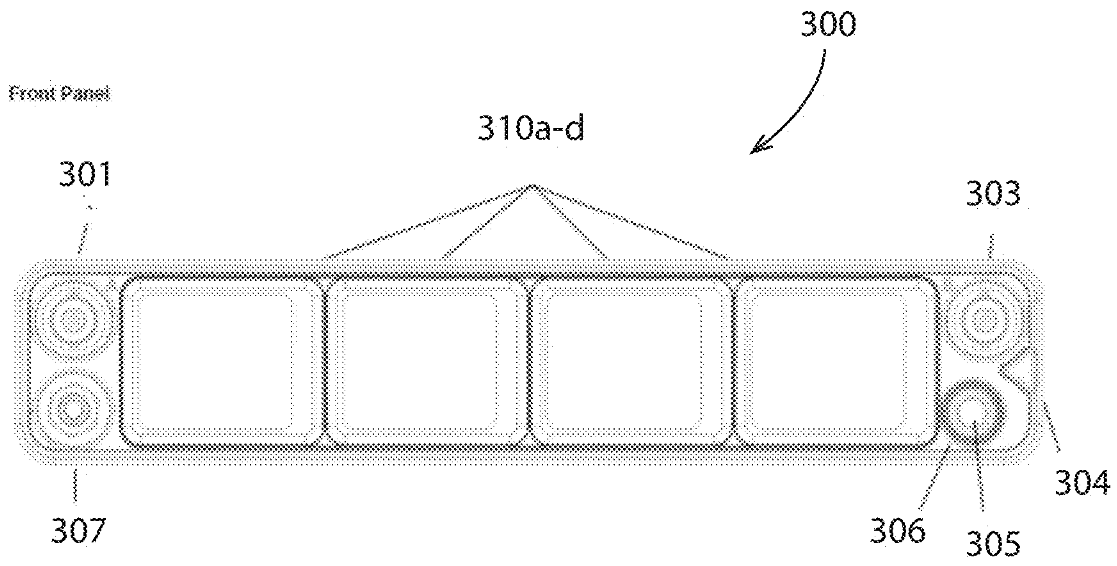
FIG. 8 is a front view of the receiver module 200 used in connection with the exemplary embodiment of the invention.

FIG. 8 shows a front view of the receiver module 300. It is a wireless receiver that may provide up to 8 channels along with tuning or pairing to multiple transmitters simultaneously. The front panel has four touchscreen displays 310*a-d* for the primary user interface, two BNC-F connectors for diversity antenna inputs 301, 303, a headphone output jack 307, menu button 304, and multi-function encoder 305.

Figure 9:
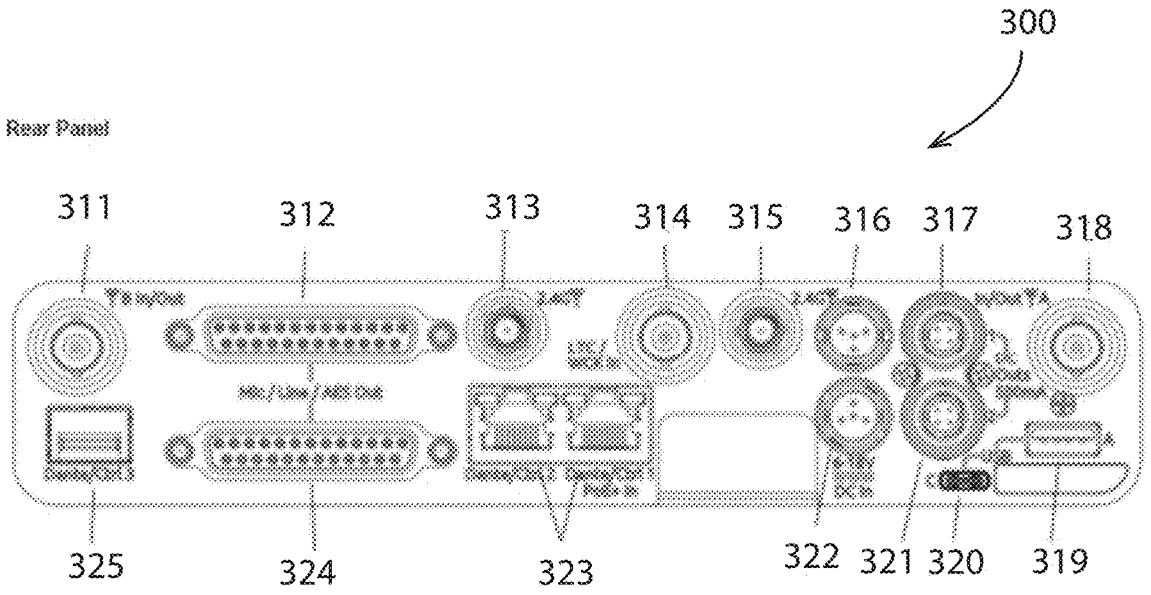
FIG. 9 is a rear view of the receiver module 200 used in connection with the exemplary embodiment of the invention.

FIG. 9 shows a rear view of the receiver module 300. The rear panel has two BNC-F connectors for diversity antenna input/output 311, 318, two SMA-F antenna ports for a 2.4 GHz backlink 313, 315 to the transmitters, two DB25-F connectors for audio output 312, 324), two RJ45 Ethernet/Dante ports (323), one SFP multi-function network connection 325, one BNC-F connector for LTC/Word Clock in 314, two TA4-M jacks for DC power in 316, 322, two 4-pin female Hirose jacks for DC power out 317, 321, one USB-A port 319 and one USB-C port 320.

Figure 10:
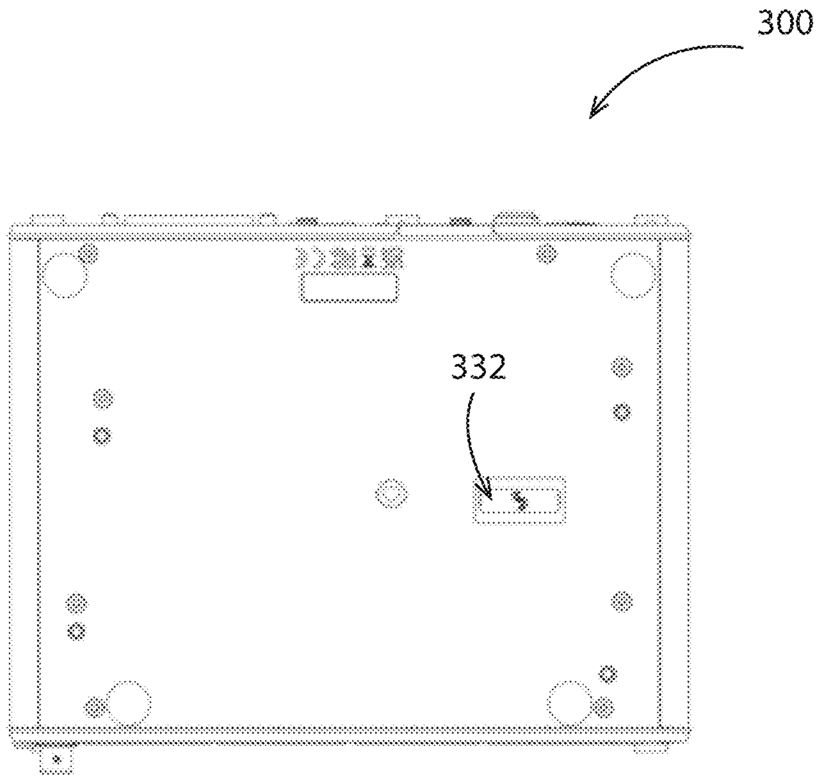
FIG. 10 is a bottom view of the receiver module 200 used in connection with the exemplary embodiment of the invention.

FIG. 10 shows a bottom view of the receiver module 300. The bottom panel incorporates an expansion port connector 332 that allows the receiver module 300 to dock with a compatible mixer-recorder 500 when used with the MICA 400. This expansion port 332 provides power to the receiver module 300 from the mixer-recorder 500 and passes audio data from the receiver module 300 to the mixer-recorder 500. When the receiver module 300 is connected to a mixer-recorder 500 using the MICA 400 and expansion port 332, most rear panel connections are disabled in the exemplary embodiment. Only the USB-A port 319 and antenna connectors 311, 318 are still active.

Figure 4:
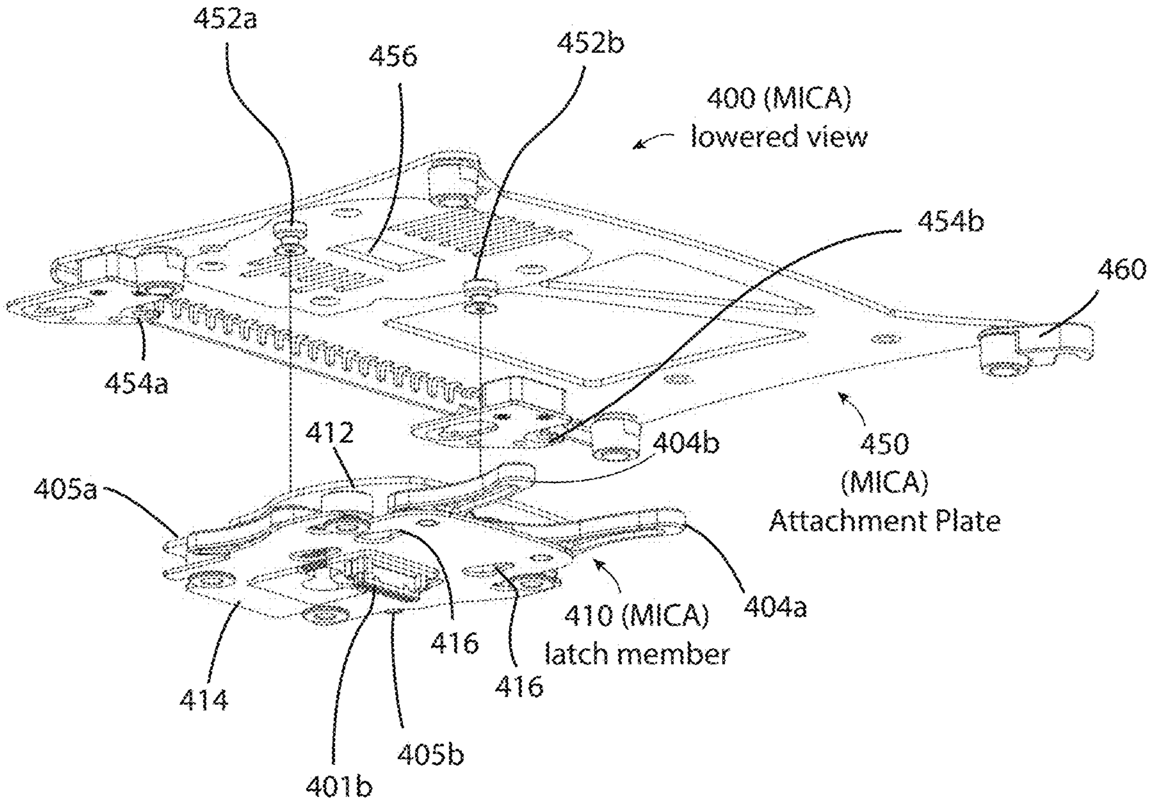
FIG. 4 is a part diagram highlighting the two main components that comprise the construction for the MICA according to the exemplary embodiment.

FIG. 4 illustrates a disassembled view of the MICA 400 which includes two main components. The first component, referred to as a MICA attachment plate 450 attaches to the bottom surface of the receiver module 300 via an array of screws or similar fasteners (labelled as 402 in FIGS. 3, 5 and 6) that attach the attachment plate 450 to the bottom surface of the receiver module 300. The second main component 410 of the MICA 400 is the MICA latch member 410, which includes a stationary plate 412 and a movable locking plate

414. The stationary plate 412 is attached to the attachment plate 450 in a semi-permanent arrangement in the exemplary embodiment. Two latch posts 452*a*, 452*b* extend downward from the attachment plate 450 on either side of an opening 456 that provides access to the expansion port 332 on the receiver module 300. Two latch levers 405*a* and 405*b* are provided on the latch member 410 to attach the latch member 410 to the MICA attachment plate 450. The latch member 410 includes first docking port 401*a* on the side adjacent the attachment plate 450, and a second docking port 401*b* on the other side. The first docking port 401*a* is aligned with the expansion port 332, through hole 456 in the attachment plate 450 and pressed into engagement which also seats the latch levers 405*a*, 405*b* around the latch post 452*a*, 452*b* on the attachment plate 450. The latch levers 405*a*, 405*b* are then closed to secure the latch member 410 and the first docking port 401*a* reliably in place with the stationary plate 412 of the latch member 410 secured tightly against the attachment plate 450.

The movable locking plate 414 on the latch member 410 is mounted to move relative and parallel to the stationary plate 412. A quick release mechanism is operated by two additional latch levers 404*a* and 404*b* on the latch member 410 to move the movable locking plate 414 from a locked position to a release position. The movable latch plate 414 has two keyhole shaped latch openings 416 which are configured to receive latch posts 503*a*, 503*b* on the top surface of the mixer-recorder 500. The latch levers 404*a* and 404*b* are squeezed towards each other to move the movable locking plate 414 and the enlarged portion of the keyhole latch openings 416 into alignment with the latch posts 503*a*, 503*b*. With the second docking port 401*b* aligned with the expansion port 501 on the mixer-recorder 500, the latch levers 404*a*, 404*b* are squeezed together to enable the second docking port 410*b* to be pushed into the expansion port 501 on the mixer-recorder 500. When the latch levers 404*a*, 404*b* are released, the movable locking plate 414 returns to its original position and the narrow portions of the keyhole latch openings 416 locks onto the latch posts 503*a*, 503*b* on the mixer-reorder 500. It is important that the MICA 400 and in particular the second docking port 401*b* be appropriately aligned with the expansion port 501 on the mixer-recorder 500 prior to attaching the MICA 400 and the receiver module 300 to the mixer-recorder 500. The MICA attachment plate 450 includes positioning hooks 454*a*, 454*b* which engage latch posts 545*a*, 545*b* (FIG. 6) on the mixer-recorder 500 to guide the MICA 400 and receiver module 300 into proper alignment so that the secondi docking port 401*b* aligns with the expansion port 501 on the mixer-recorder 500. In use, the receiver module 300 with the MICA 400 attached is placed from the rear of the mixer-recorder 500 so that the positioning hooks 454*a*, 454*b* seat on the latch posts 545*a*, 545*b* with the front of the MICA 400 tilted slightly upward. Then, the latch levers 404*a*, 404*b* are squeezed together and the MICA 400 and receiver module 300 are pushed downward to seat the second docking port 401*b* (male) into the expansion port 501 (female) on the mixer-recorder 500. Then the latch levers 404*a*, 404*b* are released to lock the MICA 400 and the receiver module 300 in place and ready for operation. In the exemplary embodiment, there is another latch 460 on the attachment plate 450 that latches onto another latch post 550 on the mixer-recorder 500 to secure the attachment even more.

The exemplary embodiment provides a specific arrangement between a microphone receiver module 300 and the mixer-recorder 500, but other arrangements are possible within the scope of the invention. For example, in many cases, two or more microphone receiver modules may be connected concurrently with a mixer-recorder. In other embodiments, one or more microphone receiver modules may mount along the bottom back or side of a mixer-recorder with additional ones optionally connected via a Cat-6 cable using DANTE® for audio data transfer. Many variations may depend on the software and/or hardware systems chosen for the given embodiment. Upon reading this disclosure, other variations may become evident to one skilled in the art and are to be considered as suggested and envisioned within the scope of this disclosure.

Referring again to FIGS. 3, 5 and 6, the modular system 200 constructed in accordance with the exemplary embodiment of the invention provides a connection for audio data from the receiver module 300 to the mixer-recorder 500 and power from the mixer-recorder 500 to the receiver module 300. In an exemplary embodiment, an Amphenol connector (part no. 161082-04622LF) provides a sufficient variety of electrical connections (internal pins) along with a construction that is sturdy enough for use in many wireless microphone environments. The expansion ports on the receiver module 300 and mixer-recorder 500 and the docking ports (male) on the MICA 400 can be any type of port that can reliably pass audio data and DC power passed from the mixer-recorder ranging from 6 to 18V DC. It is important that the ports themselves be structurally robust, and for this reason mechanical guide walls are desirably located along female expansion ports on the mixer-recorder and the receiver module. The positioning hooks 454*a*, 454*b* are also used to guide the MICA 400 and the second docking port 401*b* into the proper location as described above. When the expansion port is connected, all ports on the rear of the receiver module are desirably disabled except for the USB-A and Ethernet ports.

A series of touch-screen control panels 310*a-d*, FIG. 3 are included on the front panel of a microphone receiver module 300 to allow users to enter any settings required for the built-in wireless microphone receiver units. In some embodiments, a USB port or wireless communication with the receiver module can provide communication with an IP server allowing for web-based control of all settings including those that may be relayed to the microphone receiver module 300 through the MICA 400 (or cable) when used.

It should be understood that multiple modalities exist for the arrangement of the inter-connection(s) between a mixer/recorder module and one or more microphone receiver modules. For example, in some embodiments, two or more microphone receiver modules (rather than just a single module) may be stacked using multiple module connection apparatuses between them. As an example of another alternative embodiment, the microphone receiver module 300 could connect through a MICA 400 designed such that the microphone receiver module 300 is to be located underneath (rather than above as shown in FIG. 3) the mixer/recorder module 500.

Although the embodiments described thus far have involved use of a MICA 400 to provide a secure connection between a mixer-recorder module 500 and one or more microphone receiver modules 300, some applications may involve placing the receiver module 300 closer to the microphone transmitters or where performers are likely to be when transmitters are worn by the performer. For these embodiments, a single specialized cable (rather than a MICA 400) may provide for communication and data flow between the mixer-recorder and microphone receiver modules. For example, a custom cable (and supporting connectors) could be made to include internal conductors suitable for audio data connectivity, and possibly also constructed to include a set of larger conductors designed to also supply power (originating through the mixer-recorder) to the microphone receiver module. Using such an arrangement would allow a user to connect and operate one or more microphone receiver modules relying only on the presence of one cable between it and a mixer-recorder module. Such a specialized cable, supplying power and data connectivity is an alternative embodiment and is referred to herein as an inter-module interconnection cable (or simply as an "IMIC"). In yet other embodiments, such a cabling arrangement could allow for the stacking or daisy-chaining (via the specialized cable and connector) of multiple microphone receiver modules based on a central mixer-recorder module.

Alternatively, as mentioned previously, a single CAT-6 (Ethernet) cable may provide all required data connectivity between the microphone receiver and mixer-recorder modules. This data connectivity could include the use of the DANTE protocol for transmitting audio data packets to the mixer-recorder module, e.g., in accordance with above incorporated U.S. Pat. No. 10,433,084, entitled "Network System for Reliable Reception of Wireless Audio," by Matt Anderson.

In the exemplary embodiment, the latch posts 503*a*, 503*b* 550, 554*a*, 554*b*, 452*a*, 452*b*, each contain a circular groove about midway between their top and base that enables a slotted brace to firmly attach when slid into mating position and held in the groove. The secure attachment and release is controlled by the positioning of the MICA latch levers (404*a*, 404*b*, 405*a*, 405*b*, 460). Other embodiments may include the use of other mechanical attachment mechanisms or even an electromagnetic connection between modules, (e.g. perhaps even eliminating the physical need for a MICA 400) wherein electrically controlled magnets may be used to secure the positioning of the microphone receiver module 300 with respect to the mixer-recorder module 500 when activated by a user or software.

Figure 7:
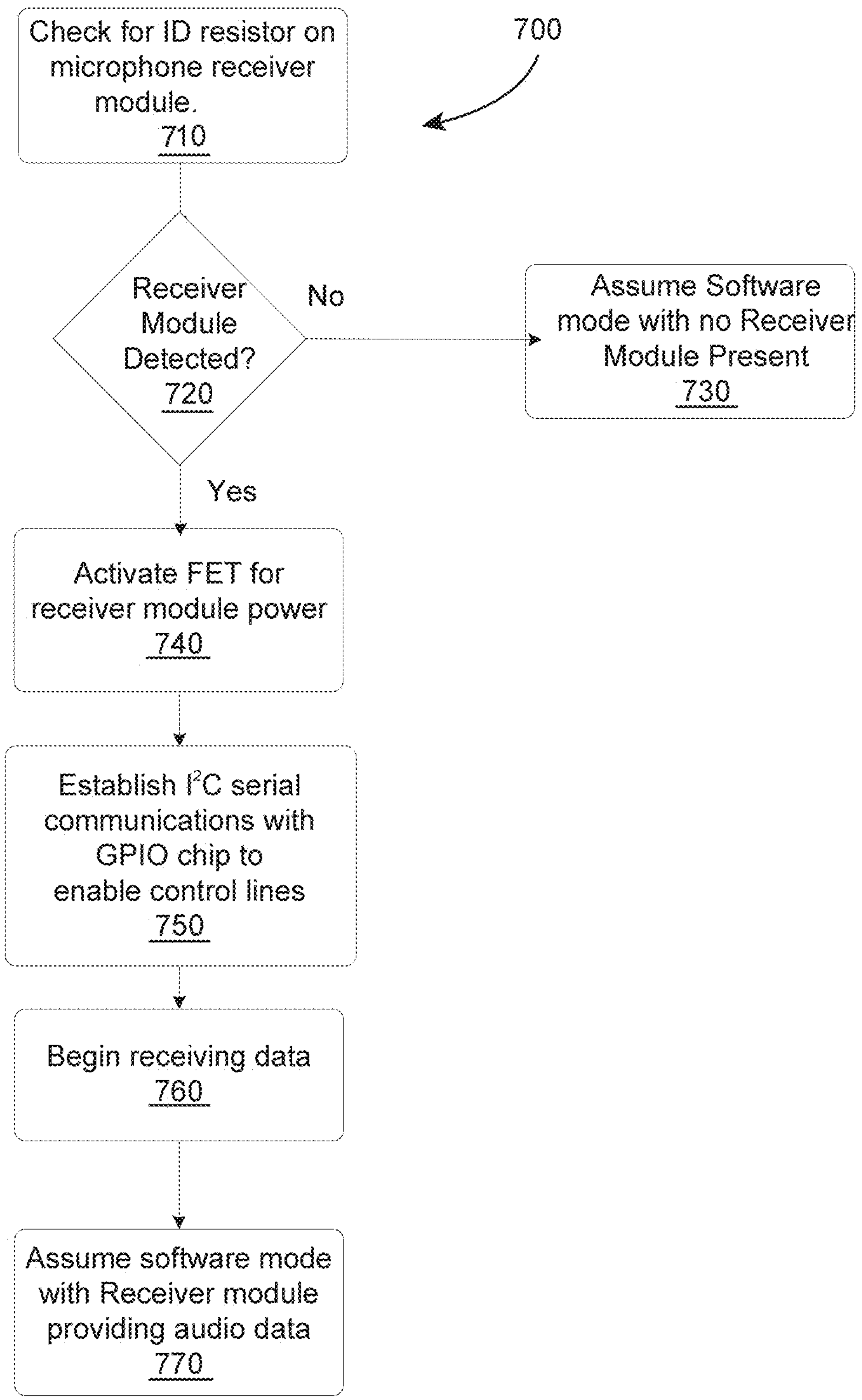
FIG. 7 is a flow-chart illustrating the steps that software in a mixer-recorder may take after power-up to determine whether a receiver module is connected via the expansion port using a MICA.

FIG. 7 is a block diagram showing select steps that may be taken by the mixer-recorder 500 and the microphone receiver module 300 immediately after power-up in order to establish communications and set up a data transfer protocol according to an exemplary embodiment.

Beginning at step 710 upon software boot-up in the mixer-recorder 500, a detection circuit tests for the presence of an ID resistor indicating an attached microphone receiver module 300. If no receiver module 300 is detected, the mixer-recorder 500 proceeds to step 730 where the software continues in a standard operation mode, assuming that regular (wired or wireless) connections exist between the mixer-recorder and the individual microphone receivers. On the other hand, if a microphone receiver module 300 is detected, the mixer-recorder 500 proceeds to step 740, where an FET is switched on to provide power to the (attached) microphone receiver module 300 through the expansion ports 501, 332 and docking ports 401*a*, 401*b* allowing the receiver module 300 to boot-up its software. When connected, the expansion ports preferably utilize a series of four low-voltage differential signaling (sometimes called LVDS or referred to as FPD-Link) pairs along with a bit-clock and data start signal to communicate audio data to the mixer.

Following this, a serial connection may be established by enabling control lines between the modules at step 750. In the exemplary embodiment, the serial communications may be based on an $I^2C$ (also sometimes referred to as IIC or I2C) protocol which allows for a synchronous, multi-controller/multi-target, packet switched, single-ended, serial communication bus to function between the modules. Next at step 760, the mixer-recorder 500 may signal the individual receiver units within the microphone receiver module to begin receiving data from their respective transmitters and transmit this data to the mixer/receiver module based on a TDM PCM format. These communications may either all take place over the MICA connectors (401*a* and 401*b* in FIGS. 3-5) or via a single IMIC connecting them. The mixer-recorder 500 then proceeds to step 770 where it continues to function as a mixer and recorder while receiving audio data from the microphone receiver module 300 based on settings supplied by the user.

Accordingly, the exemplary embodiment of the invention provides the following features (non-exhaustive listing):

1. A non-integrated RF receiver module and mixer-recorder arrangement, where the RF receiver is distinct from the mixer-recorder and control of the RF receiver module is accomplished from the RF receiver module via touchscreen displays on the front of the RF receiver module, and not via the mixer-recorder.
2. The RF receiver module can be located remotely from the mixer-recorder, connected to the mixer-recorder by Ethernet, passing audio data between the RF receiver module and the mixer-recorder. The advantage of using Ethernet is that it is designed electrically and protocol-wise for long runs such that there can be a large physical distance between the RF receiver module and the mixer-recorder.
3. The RF receiver module can be located next to the mixer-recorder, connected to the mixer-recorder by a simpler interface as compared to Ethernet since it is only required to travel a few inches instead of yards in the case of Ethernet. The advantage of using an electrical interconnect different from Ethernet is that the complexity and power consumption of this interface is an order of magnitude lower.
4. There is a mechanism which allows very quick connect and disconnect of the RF receiver module from the top surface of the mixer-recorder. This mechanism itself detaches from both the mixer-recorder and from the RF receiver module such that neither unit has an exposed connector when detached which could easily get damaged.
5. Whether RF receiver module is remote-mounted or nearby the sound technician, a built-in web server allows control of the RF receiver module using commonly available smart-phones or tablets to either augment or supplant the RF receiver modules front-panel GUI.

The invention claimed is:

1. An audio recording system comprising:

a receiver module containing one or more wireless RF receivers that receive audio data transmitted from a wireless microphone RF transmitter, said receiver module including multiple digital and analog audio ports for audio data cabling and a module expansion port which outputs audio data and receives power through pin connections;

a mixer-recorder that has multiple digital and analog audio ports for audio data cabling and a mixer-recorder expansion port which receives audio data and provides power through pin connections;

a module inter-connection apparatus having a first side and a second side, a first docking port that extends from the first side of the module inter-connection apparatus and mates with the module expansion port, a second docking port that extends from the second side of the module inter-connection apparatus and mates with the mixer-recorder expansion port;

wherein the module inter-connection apparatus is adapted to be attached to the receiver module with the first docking port being connected electronically to the module expansion port and adapted to be removably attached to the mixer-recorder with the second docking port being electrically connected to the mixer-recorder expansion port when the second side of the module inter-connection apparatus is physically attached to the mixer-recorder, and further wherein the second side of the module inter-connection apparatus has multiple quick release mechanisms to removably attach the combination of the receiver module and the module inter-connection apparatus to the mixer-recorder.

2. The audio recording system recited in claim 1 wherein the receiver module includes an ID resistor, and the mixer-recorder includes means for determining whether the ID resistor is present in a detection circuit, wherein software on the mixer-recorder assumes that the receiver module and the module inter-connection apparatus are not attached when the ID resistor is not detected to be present in the detection circuit, and when the ID resistor is detected to be present in the detection circuit, the mixer-recorder provides electrical power through the mixer-recorder expansion port to the receiver module and establishes data communication from the receiver module through the module expansion port to the mixer-recorder for audio data.

3. The audio recording system recited in claim 1 wherein the receiver module includes a data bus and the data communication from the receiver module through the module expansion port to mixer-recorder is by I2C serial communication.

4. The audio recording system recited in claim 1 wherein the module inter-connection apparatus comprises:

a. an attachment plate that attaches to the receiver module and includes an opening that provides access to the module expansion port; and b. a latch member that includes the first docking port and the second docking port, and quick release latch levers configured to releasably attach to latch posts on the mixer-recorder, wherein the first docking port passes through the opening in the attachment plate for the module expansion port when the latch member is attached to the attachment plate; and c. wherein the quick release latch levers are positioned in a closed position to connect the second docking port to the mixer-recorder expansion port and are positioned in an open position to release the second docking port from the mixer-recorder expansion port.

5. The audio recording system recited in claim 4 wherein the attachment plate includes latch posts and the latch member has latch levers that secure the latch member to the attachment plate.

6. The audio recording system recited in claim 4 wherein the attachment plate includes positioning hooks to locate the second docking port relative to the expansion port on the mixer-recorder.

7. The audio recording system recited in claim 1 wherein the module expansion port is recessed with respect to the surface on which the port is located and the mixer-recorder expansion port is recessed relative to the surface on which the port is located.

8. The audio recording system recited in claim 1 further comprising a cover or covers for the recessed expansion ports that can be used when the module inter-connection apparatus is not in use.

* * * * *